United States Patent [19]

Baller et al.

[11] Patent Number: 5,541,372

[45] Date of Patent: Jul. 30, 1996

[54] FORCE ACTIVATED TOUCH SCREEN MEASURING DEFORMATION OF THE FRONT PANEL

[75] Inventors: Theunis S. Baller; Kofi A. A. Makinwa, both of Eindhoven, Netherlands; Rémy Polaert, Limeil-Brevannes Cedex, France; Antonius J. M. Hafkamp, Doetinchem, Netherlands; Gerardus J. K. M. Koolen; Arne L. Duwaer, both of Eindhoven, Netherlands

[73] Assignee: U.S. Philips Corporation, New York, N.Y.

[21] Appl. No.: 389,444

[22] Filed: Feb. 15, 1995

Related U.S. Application Data

[63] Continuation of Ser. No. 73,812, Jun. 8, 1993.

[30] Foreign Application Priority Data

Jun. 15, 1992 [EP] European Pat. Off. .............. 92201731

[51] Int. Cl.⁶ .............................. G08C 21/00; G09G 3/02
[52] U.S. Cl. .................. 178/20; 178/18; 178/19; 345/156; 345/173; 345/174; 345/179
[58] Field of Search .................. 178/18, 19, 20; 345/156, 157, 168, 173, 174, 179

[56] References Cited

U.S. PATENT DOCUMENTS

| | | | |
|---|---|---|---|
| 4,121,049 | 10/1978 | Roeber | 178/18 |
| 4,550,384 | 10/1985 | Kimura | 178/18 |
| 4,558,757 | 12/1985 | Mori et al. | 178/18 |
| 4,680,429 | 7/1987 | Murdock | 345/173 |
| 4,801,771 | 1/1989 | Mizuguchi | 178/18 |
| 4,814,760 | 3/1989 | Johnston et al. | 178/18 |
| 4,931,782 | 6/1990 | Jackson | 345/174 |
| 4,958,148 | 9/1990 | Olson | 178/18 |
| 4,963,417 | 10/1990 | Taniguchi | 178/18 |
| 4,990,900 | 2/1991 | Kikuchi | 345/174 |
| 5,008,497 | 4/1991 | Asher | 178/18 |
| 5,117,071 | 5/1992 | Greanias et al. | 345/174 |
| 5,231,381 | 7/1993 | Duwaer | 345/174 |
| 5,376,948 | 12/1994 | Roberts | 345/173 |

OTHER PUBLICATIONS

IBM Technical Disclosure Bulletin, vol. 34, No. 7B, Dec. 1991, New York. pp. 384–385, "Method of Continuously Computing The Point of Contact on a Touch-sensitive Screen with Piezosensors".

Primary Examiner—Stephen Chin
Assistant Examiner—Vijay Shankar
Attorney, Agent, or Firm—Leroy Eason

[57] ABSTRACT

A touch screen device includes a panel; a sensor coupled to the panel for detection of a force applied to the panel and a data processor coupled to the sensor for processing data transmitted by the sensor upon detection of the force. The sensor is provided to be co-deformable with the panel for detecting a deformation of the panel itself as a result of the force being applied. This avoids the use of a rigid frame as in conventional devices, saving weight, costs and components, and reducing manufacturing problems. The sensor means may comprise strain gauges that are physically integrated with the panel. Combined with a display such device presents a minimum parallax.

9 Claims, 1 Drawing Sheet

FORCE ACTIVATED TOUCH SCREEN MEASURING DEFORMATION OF THE FRONT PANEL

This is a continuation of application Ser. No. 08/073,812, filed on Jun. 8, 1993.

FIELD OF THE INVENTION

The invention relates to a touch screen device that comprises a panel, to be touched by a user, and sensor means coupled to the panel for detection of a force applied to the panel. The touch screen device further comprises data processing means coupled to the sensor means for processing data transmitted by the sensor means upon detection of the force. The invention further relates to a panel for use in such a device.

BACKGROUND ART

A touch screen device is an input device for entering data into a data processing system. The data provided to the system are indicative of a location on the panel. The user selects the location by contacting the panel. The device's operation may be based on the detection of forces and moments of forces applied to the panel by means of strain gauges. Such a device is known from, for instance, U.S. Pat. No. 4,558,757.

In the conventional device, the panel is mechanically coupled to a rigid frame by a suspension means (see column 3, line 63). Touching the panel gives rise to strain in the suspension means as a result of the reaction forces constraining the panel relative to the frame. The actual location whereto the force is applied, or of the magnitude of the force may be calculated from the strain's location and magnitude. To this end the strains are transformed into electrical signals by the strain gauges to be processed by the data processing means.

The frame itself has to be rigid in order to form an adequate reference system relative to which the forces are measured. The rigidity is of particular importance in order to enhance linear response of the gauges and in order to avoid hysteresis effects. The linearity of the gauges' response implies that only relatively simple calculations need to be performed by the data processing means and may therefore contribute to simplicity of the processing means or to high-speed performance.

OBJECT OF THE INVENTION

A touch screen construction that uses a rigid frame has as a main disadvantage the additional weight. Especially with regard to a portable touch screen device, weight should be minimized. It is therefore an object of the invention to provide a device of the type specified above, whose weight is considerably reduced with respect to the known devices.

SUMMARY OF THE INVENTION

To this end, a touch screen device according to the invention comprises a panel for being touched by a user; sensor means coupled to the panel for detection of a force applied to the panel; and data processing means coupled to the sensor means for processing data transmitted by the sensor means upon detection of the force. The sensor means is provided for detecting an elastic deformation of the panel itself as a result of applying the force.

Instead of measuring constraining forces in the suspension of the panel, the sensor means measures the mechanical deformation of the panel itself with regard to a predetermined equilibrium shape. Experiments have demonstrated the viability of this architecture. A touch screen device of the invention brings about several advantages.

Since one can do without the rigid frame a reduction in weight, in the number of components, and in the volume of the device is attained. Any more or less inflexible underground, such as a surface of a table, of suitcase, or of a book, is sufficient to provide the necessary reaction forces. In addition, the delicate suspension is dispensed with. Attention had to be paid to the suspension during fabrication of a conventional device due to alignment problems. Note also that during use and transport of the known device the suspension is a vulnerable part as a consequence of the inertia of the panel and of the rigid frame in case of shocks. Further, since the touch screen device of the invention is a very compact apparatus, it is more versatile with regard to assembly than the conventional devices, in particular when it has to be fitted together with a display such as an LCD, a CRT or a plasma display.

The sensor means may comprise a strain gauge that is physically integrated with the panel, for example, by means of photolithographic techniques. The physical integration of a gauge with the panel renders the gauge co-deformable with the panel and provides a highly reliable sensor that is practically indestructible and only will break down when the panel itself is shattered. Accordingly, overprotection measures of, for instance, mechanical nature to prevent gauges in conventional devices from breaking, are not necessary in the device of the invention.

Beyond a certain magnitude of the applied force, the gauge does not furnish a linear response anymore. Increasing the magnitude of the force may affect the calculated position of the point of contact. The data processing means should then either be adapted to handle the non-linearities as well, or be rendered insusceptible to input data relating to forces greater than a threshold level. Preferably, the device of the invention therefore comprises threshold means coupled to the gauges for detecting whether the magnitude of a force applied to the panel exceeds a given threshold level, in order to control the data processing means. A simple control mechanism may be to stop the processing of data when the force exceeds a threshold and to retain the data that was entered into the device just before the threshold was attained. The threshold means may be coupled to a signal generator to inform the user that the applied force exceeds a threshold. The threshold level may be adjusted by the user.

Alternatively, the panel may be used as a wave guide, whose shape affects propagation of, for example, light or acoustic waves in the interior of the panel. Detection of the panel's deformation may be accomplished, for instance, by monitoring changes in the waves' interference pattern. In another embodiment, the deformation under application of a force may be detected by measuring a change in Eigenfrequencies of mechanical Eigenmodes of the deformed panel. All these examples, individually or combined, have in common that the deformation of the panel itself with regard to an equilibrium shape provides the necessary information to detect the presence of a force, and to locate the point of application and magnitude of the force applied to the panel.

A touch screen device of the invention may form a functionally and physically integral pan of a display device. For instance, the operation of a plasma display permits deformation of its front panel. Providing such a panel with, for example, strain gauges, for detection of an elastic deformation of the panel, leads to a still more compact data input device. Moreover, parallax phenomena related to selecting an area of the touch screen on the basis of information displayed underneath are reduced to a minimum.

Accordingly, a device in the invention costs less, is less heavy, is better adaptable and better proof against rough handling than a conventional device.

BRIEF DESCRIPTION OF THE DRAWING

The invention is explained in more detail hereinafter by way of example and with reference to the accompanying drawing, wherein.

DETAILED DESCRIPTION OF THE EMBODIMENTS

Figure 1:
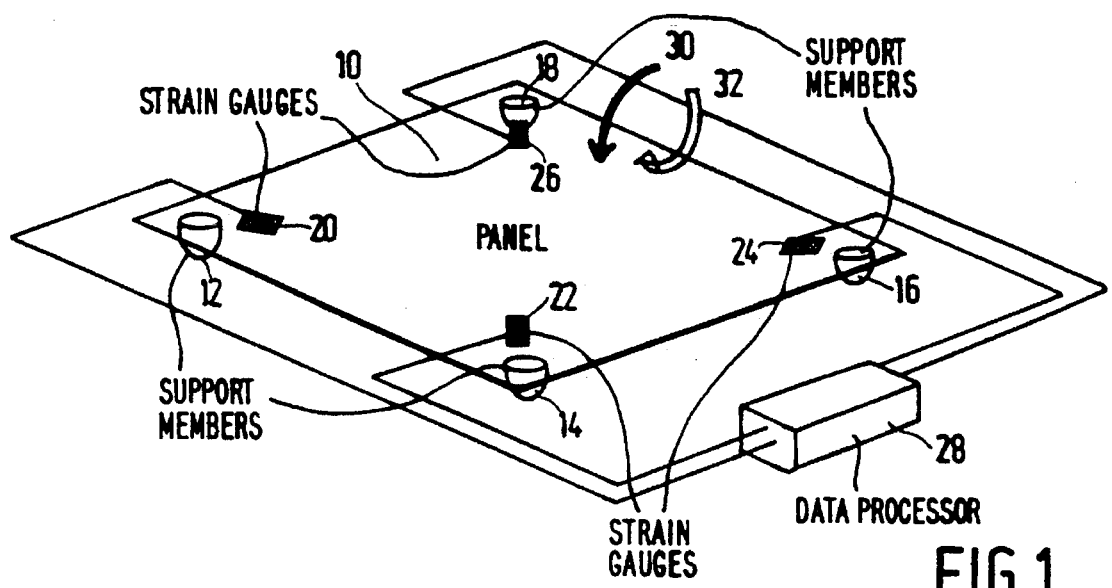
FIG. 1 shows an example of a touch screen device comprising a panel provided with gauges according to the invention.

FIG. 1 shows a first example of a force activated touch screen device according to the invention. The device comprises a panel 10 that the user has to actually touch to enter data into the device. The panel rests on support members 12, 14, 16 and 18 located in the corners of panel 10. Alternatively, panel 10 may sit, for example, on a truss (not shown) supporting panel 10, along its perimeter or on separate elongated members (not shown) arranged under, and in parallel to, the sides of panel 10. In its essence, the support mechanism for panel 10 is only meant to provide reaction forces when panel 10 is contacted by the user. The actual shape of the members is not critical to the invention as long as a reasonably rigid underground (e.g., a surface of a table, of a book, of a suitcase) is used.

The device further comprises strain gauges 20, 22, 24 and 26 that are attached to panel 10 over their full surfaces. Due to this architecture, gauges 20–26 experience the same deformation, as does panel 10 itself locally upon being touched. So, instead of conventionally measuring the reaction forces in the suspension of a touch panel in a rigid frame, now the deformation of panel 10 itself provides information about the location and magnitude of the force applied to panel 10 by a user.

In the example shown, gauges 20–26 are arranged in the vicinity of support members 12–18, respectively. Note that the shape of the shown panel 10 is a convex polygon with support members 12–18 and gauges 20–26 located at the corners. Experiments have been conducted on this geometry and indicate this to be a suitable position for detection of the deformation of the panel.

The strains cause in gauges 20–26 to provide electrical signals that in the usual way are converted into data to be processed by a data processing device 28. Data processing device 28 is connected to gauges 20–26 and comprises means for calculating the location of the point of application of the force. The means may comprise dedicated software. Experiments prove that highly acceptable accuracy in location and magnitude of force is attained when measured according to the invention.

Device 28 may also comprise a comparator to compare the calculated magnitude of the force with a threshold. When the magnitude exceeds the threshold, the calculations regarding the position of the applied force are put on hold in order to avoid non-linearities of the gauges' response affecting the calculated position. The comparator may be a part of the dedicated software in device 28.

Gauges 20–26 may be located at the same side 30 (upper surface) of panel 10 as is faced by the user, or may be arranged at the other side 32 (lower surface). There are advantages associated with either configuration.

When gauges 20–26 are present at upper surface 30, a distance between (transparent) panel 10 and a display device such as an LCD or a CRT (not shown) facing lower surface 32 is kept at a minimum, since wires, contacts and leads to gauges 20–26 are not present between panel 10 and the display. As a result, parallax effects that occur when viewing the display through panel 10 are minimized.

When gauges 20–26 are provided at lower surface 32, gauges 20–26 are shielded by panel 10 itself and, therefore, better protected against damage. In addition, the elastic deformation of panel 10 as a result of a touch is a concave shape as seen from the side of the user, lower surface 32 being stretched farther than upper surface 30. Accordingly, the arrangement of gauges 20–26 at lower surface 32 may produce a larger signal and therefore may be more sensitive than the configuration with gauges at upper surface 30.

Figure 2:
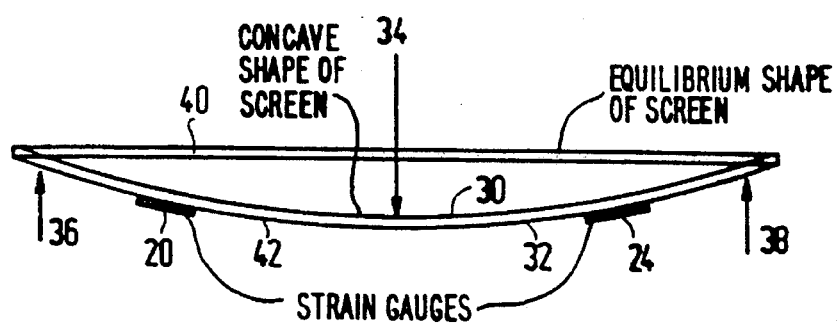
FIG. 2 illustrates a cross section of the panel provided with gauges according to the invention.

FIG. 2 illustrates the elastic, concave deformation mentioned above with reference to a cross section through panel 10 of FIG. 1. When force 34 is applied to panel 10 at upper surface 30, force 34 and reaction forces 36 and 38 in support members 12 and 16 transform an equilibrium shape 40 of panel 10 into a concave shape 42. The (local) radius of curvature of upper surface 30 is smaller than lower surface 32. This implies that lower surface 32 is stretched farther than upper surface 30. Consequently, gauges 20 and 24 located on lower surface 32 then experience a larger strain than they would do when they were fitted onto upper surface 30.

There is a variety of manners in which gauges 20–26 can be implemented. Gauges 20–26 can be parts that are separately manufactured and that are fitted onto panel 10 afterwards. Gauges 20–26 may, for instance, be glued directly to panel 10, or gauges 20–26 and panel 10 may be assembled using an intermediate material, such as rubber, between each one of gauges 20–26 and panel 10 as a mechanical buffer. A mechanical buffer may be required to prevent gauges 20–26 from breaking, in particular when gauges 20–26 are implemented as ceramic devices.

Alternatively, gauges 20–26 may be created on panel 10 through deposition of chemical compounds or through printing techniques in order to create resistive structures on a substrate. Fabrication of a thin resistive film can be achieved by means of chemical vapour deposition (CVD) or physical vapour deposition. Also photolithography or thick film printing techniques are known process options to provide a resistive structure on a substrate. In the latter option, for instance, the ink that includes materials with the required electrical properties is laid on the substrate, which will form panel 10 through a silk screen mask corresponding to the gauge design.

Note that for a given panel there exists a unique relation between the applied force and the resulting deformation. The actual relationship depends on the physical characteristics of the panel, such as the thickness of the panel, the material of the panel and the geometry represented by the locations of the support members that provide the reaction forces. As known, gauges normally furnish output signals that are linear functions of the reaction forces. The point of application of the force applied by the user is easily derived from this linear relationship. The calculations involved therefore are rather simple. In case of a non-linear behaviour, a look-up table may be employed storing the strain vs. location dependence that for each individual panel of a particular type (physical characteristics; support geometry) of a panel is substantially the same.

As known, a strain gauge measures strains that occur along its longest dimension. The actual orientation of a gauge, arranged on the panel, should therefore preferably be such that the gauge will provide the largest signal when the panel experiences a deformation. This depends on the actual strain pattern in the panel that in turn is related to the location of the support members (such as members 12–18) relative to one another.

The support members provide reaction forces upon applying a force to the panel. A strain pattern is established in the panel, which may be thought of as curves that interconnect points of equal strain. The curves are closed and, in a first approximation, concentric around the point of application of the force. The actual shape of the curves depends on, among other things, the geometry of the arrangement of support members. For example, when the locations of the support members coincide with the corners of a triangle and the point of application lies within the triangle, the curves represent a bundle of rounded off triangles that gradually approximate circles when approaching the point of application. When the support members form the corners of a rectangle, the associated curves have rounded off rectangular shapes that again gradually become smoother to approximate circles near the point of application. Accordingly, the gauges preferably have their longest dimension arranged in parallel with the average direction of the strain gradient whose direction by definition is perpendicular to the curves. The average direction may be the one that is substantially in the direction of the centre of gravity of the panel's portion lying inside the polygon whose corners coincide with the locations of the support members.

Note that more than the four gauges 20–26 of the example may be attached to panel 10. The redundancy between the output signals of the gauges distributed along the panel's perimeter may be used to take into account, for example, variations in strain caused by the orientation of the panel in a portable device relative to the earth's gravitational field, or further mechanical constraints depending on the panel assembly.

Also note that more support members 12–18 may be distributed along the perimeter of panel 10 than the perimeter has corners. This architecture may lead to a lighter, thinner and less rigid panel 10 than a panel 10 only supported at the corners of its perimeter. Gauges then may be oriented in parallel to the panel's sides.

The shape of planar panel 10 does not need to be convex. Panel 10 may be shaped in such a way that it comprises elongated projections (not shown), lying substantially in the same plane as does the major portion of panel 10. The gauges may then be arranged on the projections, each gauge having its main dimension in parallel with the projection.

Figure 3:
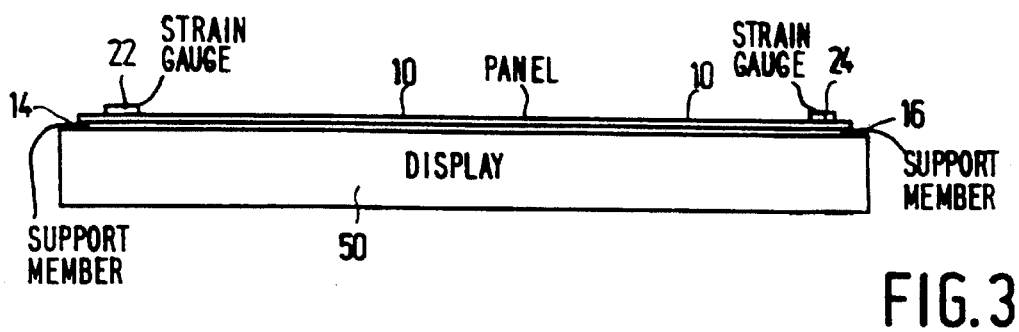
FIG. 3 gives an example of a display converted into a data input device of the invention.

FIG. 3 gives a diagrammatic side view of an example of a touch screen device in the invention. The device comprises panel 10 arranged over a display 50 via support members 14 and 16. Panel 10 is transparent. Gauges 22 and 24 are fitted to upper surface 30 of panel 10 in such a way that an elastic deformation of panel 10 by an applied force is detected and converted into signals that are used to calculate the point of application by data processing means (not shown here). Display 50 may be an LCD, a plasma display or a CRT. Specially in case display 50 is an LCD, some space should be left between panel 10 and LCD 50 in order to avoid distortion of the displayed information on LCD 50 by contact of the LCD's front screen. Support members 14 and 16 then also function as spacers.

Figure 4:
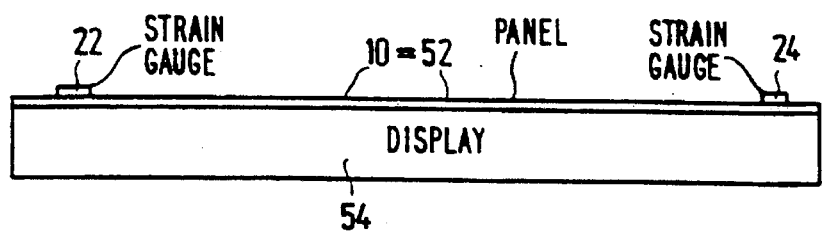
FIG. 4 gives another example of a display converted into a data input device of the invention.

In another embodiment, such as in FIG. 4, gauges 22 and 24 are directly attached to front screen 52 of display 54. Front screen 52 may just be the front panel of a commercially available display unit, or display 54 is, for instance, a plasma display. Providing such a unit with gauges then creates the basis for a touch screen device according to the invention, wherein the elastic deformation of front screen 52 is measured.

We claim:

1. A touch screen device comprising:

(a) a panel having a surface for being touched by a user;

(b) means for supporting the panel in such manner as to cause it as a whole to assume a first equilibrium shape in the absence of a touch by a user, and to cause it in response to a touch by a user at substantially any position on the panel surface to mechanically deform elastically and to assume as a whole a second equilibrium shape different from the first equilibrium shape, the elastic mechanical deformation producing strain in the panel;

(c) plural sensor means coupled to spaced portions of the panel for detecting the strain produced within each of said portions of the panel due to said mechanical deformation, and generating data signals indicative of the detected strains; and (d) data processing means coupled to the plural sensor means for receiving and processing the data signals generated thereby so as to determine the position at which the panel surface is touched by a user.

2. The touch screen of claim 1, wherein the plural sensor means are strain gauges mounted on and co-deformable with the panel.

3. The touch screen of claim 2, wherein the means for supporting the panel comprises four supports only at the corners of the panel and that suspend the panel above a surface on which the four corner supports rest.

4. The touch screen of claim 3, wherein four strain gauges are used as the plural sensor means, each of said strain gauges being located adjacent a corner support.

5. The touch screen of claim 2, wherein the strain gauges are located on a surface of the panel opposite to the surface touched by the user.

6. The touch screen of claim 1, wherein the first shape is flat and the second shape is concave.

7. The touch screen of claim 1, wherein the means for supporting the panel comprises supports only along the perimeter of the panel.

8. The touch screen of claim 7, wherein the plural sensor means each have a long dimension, and are located on the panel with the long dimensions thereof parallel to the perimeter of the panel.

9. The touch screen of claim 2, further comprising threshold means for detecting when the deformation of said panel exceeds a given threshold level, and coupled to the data processing means for controlling the data processing means.

* * * * *